Aug. 4, 1953 K. L. BERGVALL ET AL Re. 23,693

BOX BEAM CONSTRUCTION FOR FLOORS

Original Filed April 27, 1945 2 Sheets-Sheet 1

INVENTORS
Knut Lennart Bergvall
Ernst Erik Dahlberg
By [illegible]
their ATTY.

BOX BEAM CONSTRUCTION FOR FLOORS

Original Filed April 27, 1945 2 Sheets-Sheet 2

INVENTORS
Knut Lennart Bergvall
Ernst Erik Dahlberg
By Otto Munk
his Att'y.

Reissued Aug. 4, 1953 Re. 23,693

UNITED STATES PATENT OFFICE 23,693

BOX BEAM CONSTRUCTION FOR FLOORS

Knut Lennart Bergvall and Ernst Erik Dahlberg,
Stockholm, Sweden

Original No. 2,579,446, dated December 18, 1951,
Serial No. 590,530, April 27, 1945. Application
for reissue January 28, 1953, Serial No. 333,854

10 Claims. (Cl. 20—2)

Figure 1:
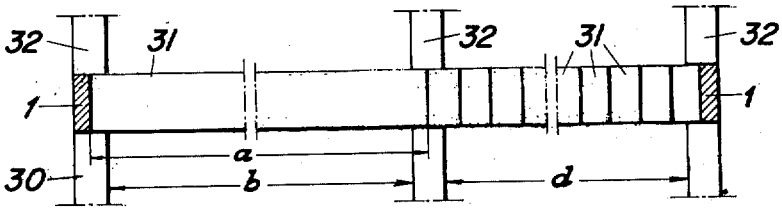

Matter enclosed in heavy brackets [ ] appears in the original patent but forms no part of this reissue specification; matter printed in italics indicates the additions made by reissue.

This invention relates to a novel *wooden* structural building element for prefabricated buildings, and to a novel *wooden* building formed of such elements.

[For the purpose of transferring] *In order to transfer* the manufacturing of a building from the building-site to the factory, it is necessary to divide [up] the large wall-spaces, the framings of joists etc. into smaller parts [,] *or* elements, which can be mechanically manufactured in a factory and afterwards easily put together at the *erection* site. For that reason it is impossible, in a rationally working production of portable wooden buildings, to write the dimensions of the building or its rooms quite arbitrarily, but they are to be varied in determined steps corresponding to the so-called module measure. In order to satisfy practical demands for various room dimensions [etc.] the module measure has to be kept as low as 10 to 20 centimeters. *In existing prefabricated arrangements, wall* [Wall] and joist elements are usually *produced* [effected] in normal widths *at least* several times larger than the chosen module measure. In order to satisfy all demands for various room dimensions [within the frame of the chosen module, consequently there has to be produced, except] *which are multiples of the selected module measure, it is necessary to produce, in addition to the* elements of normal width, a large amount of extra elements of *varying* smaller dimensions. *Thus, existing prefabricated building structures do not utilize, to the maximum extent, the advantages of standardization of elements.*

The present invention [refers] *relates* to elements by means of which the above difficulties are avoided, and it is principally characterised in that all or almost all the building-elements are of the same width, being equal to the chosen module measure [on one hand,] and of the same range of size as the thickness of the [occurring] intermediate walls *or partitions* of the building, [on the other hand,] *or* for instance equal to two times this measure, and that the assembly of elements, after having been joined together, form a complete wall [including a complete framing of joists] *or floor and ceiling structure.* By means of this arrangement it is possible to erect a building essentially by means of [one] *a* single type of [elements] *element.* [Accordingly] *Further,* the frame [element] *elements* included in the building are of the same width as the wall *or floor and ceiling forming* elements, [through which the advantage is obtained] *so* that both wall *or floor and ceiling forming elements* and *their* framing elements can to a large extent be produced out of standardized details.

According to the present invention the production of the wall elements is furthermore quite independent of window- and door-apertures, the [body] *wall structures* being built up of the elements in such a way [,] that necessary window- and door-apertures as formed to *accommodate* [wherein] windows and doors *which* are inserted later on, at the building-site, which to a large extent decreases the number of element types [being necessary] *required* to meet various demands with reference to *the location and size of* window or door apertures.

When [a frame of] *the structure of a* building is to be erected by means of the elements according to the present invention, the joist elements are placed with their [edges straight] *end edge portions resting* on the top [edge] edges of the outer or inner walls, [the same thing holding good not only for the walls supporting the elements, but also for] *and the side edge portions of certain of the joist elements rest upon the top edges of* the walls running parallel to the longitudinal direction of the joist elements placed on outer walls being protected by a special wall element, the thickness of which is equal to one half of the wall thickness and the height of which is equal to the thickness of the joist elements.

An advantageous construction of the element according to the present invention includes a box-beam having two [opposite] *parallel and spaced apart* side walls *or flange members* connected by two *parallel and spaced apart* end walls *or web members,* so constructed and arranged that the edges of the side walls project beyond the [edges] planes of the end walls *or webs,* the projecting portions [or] *constituting* flanges [being] intended to abut [closely] *against the flanges of* similar adjoining elements in the building.

In a building [with a wooden frame those walls of the said] *embodying the present invention, the walls of the* box beam which are parallel with the plane of the [ready-made wall-spaces or framings of joists,] *wall or floor construction* are made of *plywood including* several wooden courses or plies, the fibres of which run in different directions. In order to obtain tight joints between the elements, the projecting portions or *flanges at the* longitudinal edges of the side walls are provided with tongues and grooves, a moisture resistant packing being provided at the bottom of the groove.

*In the box-beam embodying the present invention,* [The] *the* projecting [ends] *edge portions or flanges* of the side walls [of the box-beam structure] form a channel with the respective adjoining end wall *or web* for the reception of a resilient insulating pad, which projects slightly beyond the edges of the side walls.

In the accompanying drawing a constructional form of an element according to the invention is [exemplified] *illustrated by way of example to show the manner in which such elements are employed in erecting a wooden building.*

*In the drawing:*

Figure 2:
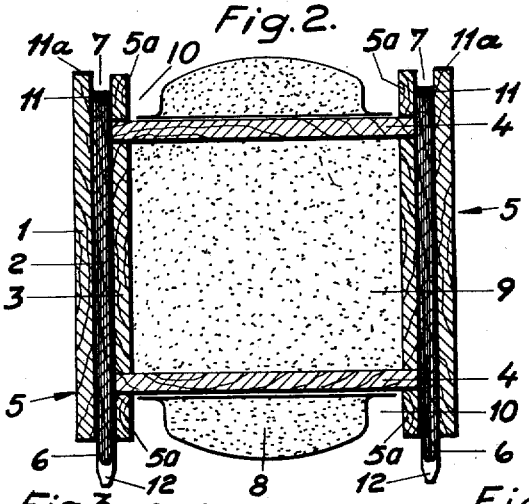
Figure 3:
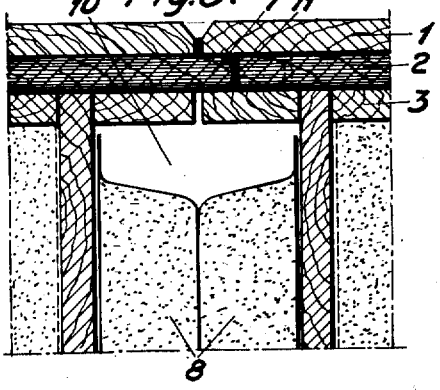
Figure 4:
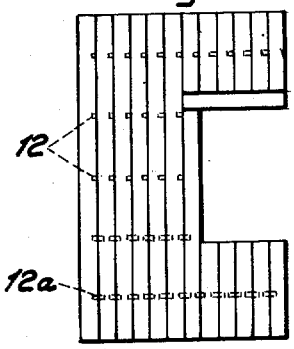
Figure 5:
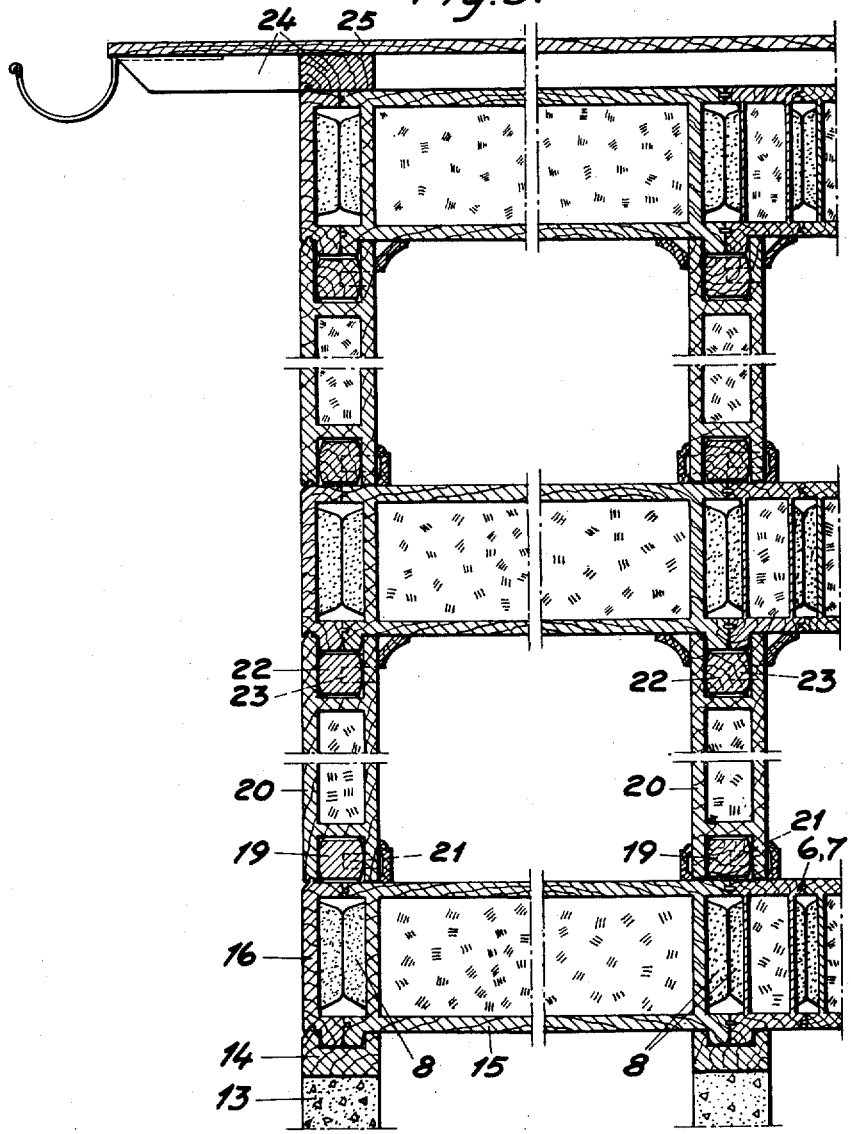

Fig. 1 [shows a diagram of the arrangement as practised on a framing of footings.] *is a diagrammatic view showing the arrangement of elements on prepared footings to erect a wooden building in accordance with the present invention.* Fig. 2 represents a section through a box-beam according to this invention, and Fig. 3 shows a *fragmentary* section through a portion [of part] of a joint between two adjoining box-beams, to show how they are joined together to form a wall or floor. Fig. 4 represents in elevation a diagram of a part of a wall, erected by joining together a plurality of box-beams and Fig. 5 is a vertical section through a part of a two-storied building showing the use of box-beams according to this invention to make floors, walls, partitions and ceilings.

[In Fig. 1 is illustrated in the form of a diagram how a frame of] *Fig. 1 diagrammatically illustrates how a* building is erected in a rational manner [, which is attained by the fact that the plate] *by dimensioning the wall and floor structures so that each floor structure* formed by the hoist elements projects at every edge out upon the *top edges of the* underlying wall [element] *structure* to an extent of half a module measure. At the [end side] *edges* of the [framing joists] *joist or floor structures,* the wall-thickness is filled out by means of an always [equally] *uniformly* shaped filler element 1. [Thus, the further advantage is obtained that] *Further,* all the joist elements are of lengths which represent [a] whole [multiple] *multiples* of the module measure. Thus, in the figure, a, b, c and d are whole multiples of the chosen module measure.

[The figure] *Fig. 1* is a schematic elevation through a building erected by means of interconnected box-beam elements, the left hand portion thereof showing a longitudinal elevation of a *joist assembly which provides both* [combined] floor and ceiling while the right hand portion thereof shows a transverse diagrammatic section of such a combined floor and ceiling. The figure is intended only to show the main principle of erecting a building according to the invention. Therefore, the box-beam structure of the individual elements is not particularly set forth therein. In this figure, a represents the length of a box-beam *element* 31 according to the invention, resting on footings 30, [forming a floor] *and cooperating with other similar elements to provide a complete floor or joist structure.* In the right hand portion of the figure d represents, diagrammatically, [a transverse section through the floor] *the distance between the confronting faces of the footings 30 measured in the transverse direction,* the box-beams 31 being shown at right angles to their position in the left [half] *hand portion* of the figure. The numeral 32 represents a box-beam according to the invention, erected vertically to form a wall.

*Each of the elements 31 and 32 forming the wall and floor structures, respectively, is constructed in the manner illustrated in Fig. 2.* The box-beam shown in Fig. 2 has spaced, parallel sides *or flange members* 5, each including three wooden courses *or plies* 1, 2 and 3 glued together, the outer [ones of which have] *and inner plies having* their fibres parallel to the longitudinal direction of the [plates] *flange members* and the intermediate [course of which has] *ply having its* fibres perpendicular to said direction. The intermediate course *or ply* effectively reduces the shrinking and expanding of the [two outer courses] *inner and outer plies,* which permits the variations of the width per element to be decreased to a maximum of approximately 0.3 millimeter. The sides *or flange members 5* are kept in their relative [position] *spaced apart positions* by ends *or web members* 4 arranged along the elements and *each* consisting of [rather constant volume plates] *a plate of uniform cross-section* glued together of, for instance, wood fibre, plywood or coursed wood. The [said plates are] *web members 4 are parallel to each other and perpendicular to the flange members 5, with the edges of the web members being* seated in longitudinal grooves formed [on] *in* the inner [face] *faces* of said [sides] *flange members* spaced from the edges [thereof] *of the latter.* [The projecting portions 5a or flanges are thus formed on said sides.] *Thus, the edge portions of members 5 project beyond the web members 4, as at 5a, to provide flanges.* These projecting [sides] *flanges,* together with the adjoining [wall] *web member* 4, form a channel for the reception of an insulating pad 8. In the course of the manufacturing operation the intermediate [courses 2 of the elements] *plies 2 of the flange members 5* can be displaced *laterally* in relation to the [two outside plates] *outer and inner plies 1 and 3, respectively,* so that a tongue 6 and a groove 7 are formed *along the opposite longitudinal edges of each flange member,* which are fitted together with corresponding *parts of* adjoining elements when the erection takes place. Due to the shape of the elements there is obtained a closed chamber 9 *defined by the interior surfaces of the flange and web members and* [,] which is filled with a suitable insulating material. The cushions 8 [suitably] are made narrower than the space *or channel* between the *projecting* flanges *5a* so that an air chamber or an air channel 10 is obtained between the cushions and the flanges when the elements are assembled (see Fig. 3). Through this channel *10* electric wires [etc. can be suitably drawn], *plumbing and the like can be passed.* In connection with the outer walls the channel furthermore brings the advantage that, being put into communication with the outer air, it serves as draining channel for the heat insulating material of the elements, because the moisture within the wall will move towards the cold channel and vaporize. The condition, however, is that the cross bracings are of a material apt to permit vapour diffusion. Furthermore in outer-wall elements the channel *10* serves as a draining channel for water [having eventually] *which has* been able to penetrate the [match-joint] *tongue and groove joint between the abutting edges of adjoining flanges,* and prevents this water from soaking in the filling *or resilient pads 8* [through the capillary force]. *Reference numerals* 11 and 11a indicate resilient packings *which are placed in the tongue and groove joints to deter the seepage of water therethrough.*

[In the form of a diagram] Fig. 4 *diagrammatically* illustrates a wall formed of box-beam elements according to this invention, and [how, by means of] *the manner in which* dowels or teeth 12 [,] *on* one box-beam [is connected] *are employed for connecting the latter* with adjoining similar box-beams so as to absorb the wind forces, said dowels or teeth being obtained, for instance, by making the tongue 6 deeper at certain points, so that the tooth thus obtained enters a corresponding *or registering* cavity *formed* in the groove 7. [Loose] *In place of the teeth formed on the tongue 6, loose or separate* dowels 12a may also be used *to be received in registering recesses or cavities formed in both of the abutting edges of adjoining elements.*

Fig. 5 illustrates a section through a part of a two-storied building [with a wooden frame] *formed of wood and* erected by means of the [box-beams] *box-beam elements* according to the invention. The [erection is performed] *building is erected* in the following manner:

[On the foundation-wall a] *A* carefully levelled ground beam 14 is placed *on each of the previously prepared foundation walls 13.* Then the box-beams 15 according to Fig. 2 are laid [for the floor] *with their opposite ends resting upon the ground beams 14* and are fixed to the ground [beam 14] *beams,* for instance by means of nails through the bottom [flanges] *flange members.* [, tightening] *A tight seal* between the *adjoining* elements [being] *is* obtained through the tongues 6 [,] *and the grooves* 7 and the tightening *or sealing* cushions 8. *As seen in Fig. 5, the opposite ends of the interior cavity of each box-beam element are closed by end walls which are spaced from the corresponding end edges of the flange members so that a recess is defined at each end of the element. Cushions 8 are also disposed in these end recesses to provide a seal between the abutting ends of longitudinally aligned box-beam elements. Further, the lower flange member of each box-beam element is preferably formed with a depending rim or ridge which seats in the upwardly opening channel defined by the related ground beam 14 thereby preventing longitudinal movement of the box-beam elements 15 relative to the ground beams. When all of the elements 15 have been installed in side-by-side relationship, the lower flange members of the elements provide the ceiling surface of the underlying basement or cellar, while the upper flange members provide the flooring for the room thereabove.* After all of the elements of the *first* floor *construction* [having] *have* been placed and joined together, the horizontal filler wall elements 16 are fixed to the ends of the box-beam elements and to the ground [beam] *beams* 14 *which seat upon the outer foundation walls.* [Upon the surface thus obtained a plate 19 is placed and fixed,] *A plate or sill member 19 is then placed and fixed upon the top surface of the first floor construction extending along each of the joints between endwise abutting elements and the joints between the filler elements 16 and the adjacent ends of the box-beam elements, that is, along the lines corresponding to the locations of the inner walls or partitions and of the outer walls,* said plate *or sill* being perforated with an *horizontal* aperture for each element *included in the corresponding wall.* After that the wall elements 20 are raised in the manner shown in Fig. 4, beginning at a corner where the first element is temporarily stayed [right] *in a perpendicular*

*position as determined* by a plumb bob. After [that] the *corner box-beam element of the wall construction has been erected, the remaining* box-beams are erected and joined together, one by one, the *box-beam* elements being connected by tongue and groove, and then the bottom ends of the elements are fixed in their exact positions by means of a dowel 21 [being] driven through a *suitable* hole in the *inner flange member of the box-beam element and into the corresponding aperture of the sill 19.* [beam corresponding to a hole provided in the side 5a] After a number of box beams have thus been [thus] erected to form a wall, an upper plate *or sill* 22, perforated *at spaced locations* along its length for the reception of dowels 23, is placed *on the upper ends of the side-by-side disposed wall elements and secured to the latter* in the same manner as the [beam] *sill* 19. [In the same manner as at the bottom ends of the box-beams, the upper ends of the beams forming the wall are now fixed in their positions by means of dowels 23 at the upper ends.] *Thus, the sills 19 and 22 and the corresponding dowels 21 and 23 secure the wall forming elements 20 at their upper and lower ends against lateral separation.* [Thus each box-beam is secured at its upper and lower ends.] The dowels or teeth 12 give to the wall the necessary stiffness to resist side forces such as *forces exerted against the building by* wind in the *plane of the* wall surface. *Further, the dowels 12 prevent relative longitudinal or vertical movement of the wall forming box-beam elements.* Upon the walls thus raised and secured the next [framing element] *floor or joist construction* is then placed and the erecting operation is repeated as described above.

*The reference numeral* 24 indicates battens upon which roof boarding *or* plates 25 are placed and secured by nails.

*From the above description, it is apparent that the flange members 5 of the box-beam elements forming the wall constructions provide the interior wall surface and exterior building surface in the outer walls or the wall surfaces of rooms separated by partition walls. Further, the flange members 5 of the box-beam elements forming each floor construction provide the ceiling of the room below and the flooring of the room thereabove. Since each of the box-beam elements has a width, that is, the distance between the outer surfaces of the opposite flange members 5, equal to the thickness of the wall or floor construction of which it is a part, such box-beam elements provide the supporting structure and the opposite surfaces of the wall and floor constructions. It is also apparent from the above description and Figs. 1, 4 and 5 that each box-beam element of the floor construction and all of the box-beam elements of the wall construction, with the exception of those defining window or door openings, has a length equal to one full or overall dimension of the construction of which it is a part. Finally, as previously stated, the distances between the centers of wall constructions defining a room are selected as whole multiples of a module measure, and the widths of the box-beam elements are either one or more times the module measure, depending upon the construction of which it forms a part, while the thickness of each box-beam element, that is, the lateral dimensions of the flange members 5 thereof, is preferably equal to the module measure or some whole multiple thereof, so that the entire wooden*

*building may be erected from a limited number of different types of box-beam elements.*

The invention, of course, is not confined to any fixed measure of the elements, but [they] *the latter* can be varied within suitable limits *as herein set forth.* Likewise [can] any suitable insulating- or filling-material *can* be used [according to the purpose of] *so long as it provides the required* heat or sound insulation. The casing of the cushions 8 can be made of any moisture impermeable material.

Having now described our invention, what we claim as new and desire to secure by Letters Patent is:

1. In a building, a room having walls and a wooden floor construction comprising a plurality of interengaged parallel, elongated box-beam elongated box-beam elements of tubular configuration in cross section arranged in side by side relationship, each element having a width substantially equal to the thickness of the floor and a length at least equal to one horizontal dimension of the room bounded by said walls, and each element comprising spaced parallel flanges and spaced, parallel webs arranged between said flanges and connected thereto, said flanges forming upper and lower members in the construction, the upper member forming the flooring in the room above the floor construction and the lower member forming the ceiling in the room below the construction, the flanges of each box-beam element having their edges tongued and grooved and interengaged with adjacent similar members in the construction to form said floor and ceiling, said tongued and grooved portions being provided with corresponding dowels and sockets, respectively, engaging adjacent like members to stabilize the construction.

2. *In a building, wooden wall and floor constructions defining a room, each of said constructions comprising a plurality of interengaged parallel and elongated box-beam elements of tubular configuration in cross section arranged in side by side relationship, each of said elements having a width substantially equal to the thickness of the construction of which it is a part, the elements of said floor construction each having a length at least equal to one horizontal dimension of said room bounded by the wall constructions, the elements of said wall constructions extending vertically and at least certain of the last mentioned elements having a length substantially equal to the distance between superposed floor constructions defining the height of said room, each of said elements including spaced parallel flanges and spaced parallel webs arranged between said flanges and connected to the latter, said flanges forming upper and lower members in said floor construction and inner and outer members in said wall constructions, said upper member forming the flooring in the room above the floor construction and said lower member forming the ceiling in the room below the construction, said inner member forming the interior wall surface of the room defined by the wall construction and said outer member forming the exterior wall surface of the building, said flanges of each box-beam element in the wall construction having the edges thereof tongued and grooved and interengaged with adjacent elements in the wall construction to form said interior and exterior surfaces, said flanges of each box-beam element in the floor construction having the edges thereof tongued and grooved and interengaged with adjacent elements in the floor construction to form*

*said floor and ceiling, said tongued and grooved edges of each element having dowels and sockets, respectively, engaging sockets and dowels of adjacent elements to stabilize said constructions.*

3. *In a building, wooden wall and floor constructions defining a room, each of said constructions comprising a plurality of interengaged parallel and elongated box-beam elements arranged in side by side relationship, each of said elements being of tubular configuration in cross section and including spaced parallel flanges and spaced parallel webs arranged between said flanges and secured to the latter, said elements being disposed in the respective constructions so that said webs extend perpendicular to the plane of said respective construction, each of said elements having a width substantially equal to the thickness of the construction of which it is a part so that said flanges of the elements form the inner and outer wall surfaces and the flooring and ceiling of the rooms above and below the related floor construction, at least certain of said elements in said wall construction and all of said elements in the floor construction having lengths which are substantially equal to an over-all dimension of the respective construction, said flanges of each box-beam element in the wall construction having opposite edges thereof tongued and grooved and interengaged with the next adjacent elements in the wall construction, said flanges of each box-beam element in the floor construction having opposite edges thereof tongued and grooved and interengaged with adjacent elements in the floor construction to form said floor and ceiling, said tongued and grooved edges of each element having dowels and sockets, respectively, engaging the sockets and dowels of said next adjacent elements to stabilize said constructions.*

4. *In a building, wooden wall and floor constructions defining a room according to claim 3; wherein said elements of the wall constructions are upstanding; and wherein the thickness and width of each of said elements is a whole multiple of a predetermined module measure and the overall dimensions of said wall and floor constructions, measured in the directions at right angles to the longitudinal axes of the respective elements, are also whole multiples of said predetermined module measure.*

5. *In a wooden building construction, a plurality of elongated, slender box-beam elements interconnected in side by side relationship to form complete wall and floor structures therein, each of said box-beam elements comprising spaced parallel flange members of plywood and spaced parallel webs arranged between said flange members and fixed thereto, said flange members having parallel grooves in the confronting inner surfaces thereof receiving the longitudinal edges of said web members, said flange members further having their longitudinal edges formed with tongue-and-groove connectors interengaging corresponding connectors on adjoining elements of the related structure to form substantially smooth outer surfaces on the wall and floor structures, each of said elements having a width substantially equal to the thickness of the structure of which it is a part and a length substantially equal to one overall dimension of said structure of which it is a part.*

6. *In a wooden building construction; the combination according to claim 5, wherein said tongued and grooved longitudinal edges of each element are formed with projecting dowels and*

*cavities, respectively, for engagement with corresponding cavities and dowels of adjoining elements in the wall and floor structures.*

*7. In a wooden building construction; the combination according to claim 5, wherein said grooves formed in the confronting inner faces of the flange members are spaced from the longitudinal edges of the latter so that the edge portions of said flange members project laterally beyond said web members to define flanges, said flanges and the outer surfaces of said web members defining laterally opening channels, and longitudinal, insulating cushioning members mounted on said outer surface of each web member and extending the length of the related channel.*

*8. In a wooden building construction; the combination according to claim 7, wherein each of said elements further includes end plates closing the opposite ends of the interior space defined by said flange members and web members, and insulating material filling said interior space.*

*9. In a wooden building construction; the combination according to claim 7, wherein said cushioning members are resilient and have a normal thickness exceeding the distance that said flanges extend beyond said web members so that said cushioning members are compressed against the cushioning members of adjoining elements when the elements are arranged in side by side relationship.*

*10. In a wooden building construction; the combination according to claim 9, wherein said cushioning members have widths substantially less than the distance between said flange members so that air spaces are provided between said cushioning members and flanges to permit draining of moisture from the wall and floor structures.*

KNUT LENNART BERGVALL.
ERNST ERIK DAHLBERG.

References Cited in the file of this patent or the original patent

UNITED STATES PATENTS

| Number | Name | Date |
|---|---|---|
| 741,040 | Jones | Oct. 13, 1903 |
| 791,293 | Schietkiewicz | May 30, 1905 |
| 1,009,468 | Burrowes | Nov. 21, 1911 |
| 1,087,011 | Grasso | Feb. 10, 1914 |
| 1,153,900 | Fairbank | Sept. 21, 1915 |
| 1,291,160 | Rook, Jr. | Jan. 14, 1919 |
| 1,421,124 | Brandt | June 27, 1922 |
| 1,444,554 | Quillet | Feb. 6, 1923 |
| 1,729,632 | Stone | Oct. 1, 1929 |
| 1,868,236 | Janzen | July 19, 1932 |
| 1,948,950 | Tiemann | Feb. 27, 1934 |
| 2,187,148 | Fisher | Jan. 16, 1940 |
| 2,199,112 | O'Leary | Apr. 30, 1940 |
| 2,202,745 | Muse | May 28, 1940 |
| 2,257,048 | Fulbright | Sept. 23, 1941 |
| 2,273,775 | Strong | Feb. 17, 1942 |
| 2,324,706 | Jacobson | July 20, 1943 |
| 2,416,269 | Paul | Feb. 18, 1947 |

FOREIGN PATENTS

| Number | Country | Date |
|---|---|---|
| 23,268 | Austria | Feb. 26, 1906 |